United States Patent [19]

McNeill et al.

[11] Patent Number: 5,542,342
[45] Date of Patent: Aug. 6, 1996

[54] COFFEE GRINDER AND BREWER APPARATUS WITH BASKET SENSING AND GRIND ONLY FEATURE

[75] Inventors: Robert C. McNeill, Jeffersonville, Ind.; Douglass Nance, Louisville, Ky.

[73] Assignee: Grindmaster Corporation, Louisville, Ky.

[21] Appl. No.: 512,305

[22] Filed: Aug. 8, 1995

[51] Int. Cl.$^6$ .................................................. A47J 31/42
[52] U.S. Cl. .............................. 99/280; 99/286; 99/289 R
[58] Field of Search .............................. 99/279, 280, 283, 99/282, 285, 286, 289 R, 290, 295, 300, 304, 307; 241/101.2

[56] References Cited

U.S. PATENT DOCUMENTS

| | | |
|---|---|---|
| 2,852,202 | 9/1958 | Ditting et al. . |
| 4,226,175 | 10/1980 | Sandor . |
| 4,406,217 | 9/1983 | Oota . |
| 4,607,200 | 8/1986 | Zimmerman . |
| 4,624,177 | 11/1986 | Ito .............................................. 99/286 |
| 4,742,767 | 5/1988 | Komatsu et al. . |
| 4,893,758 | 1/1990 | Foley et al. . |
| 4,967,649 | 11/1990 | Ephraim et al. . |
| 5,083,502 | 1/1992 | Enomoto ..................................... 99/286 |
| 5,172,868 | 12/1992 | Midden . |
| 5,186,399 | 2/1993 | Knepler et al. . |
| 5,195,422 | 3/1993 | Newnan . |
| 5,224,414 | 7/1993 | Hunt . |
| 5,241,898 | 9/1993 | Newnan . |
| 5,287,795 | 2/1994 | Enomoto ..................................... 99/280 |
| 5,387,256 | 2/1995 | Enomoto ..................................... 99/286 |

Primary Examiner—Robert W. Jenkins
Attorney, Agent, or Firm—Wheat, Camoriano, Smith & Beres, PLC

[57] ABSTRACT

A coffee bean grinding and brewing apparatus having a control circuit for initiating grinding and brewing cycles. The control circuit has a brew basket sensing switch that is positioned adjacent the brew basket retaining arms and is engaged into an open position by one of the arms when no basket is positioned between the arms and becomes closed when a basket is positioned between the arms. The control circuit does not initiate any cycle as long as the sensing switch is open avoiding the problem of grounds being delivered accidentally when no basket is present. Additionally, the control circuit has a grind-only switch and a brew-only switch that respectively permit an operator to select a grind-only or a brew only cycle when a basket is held properly between the arms. Finally, the circuit may be provided with a partial and full brew selector switches that permit an operator to select a full and predetermined amount of ground coffee and/or hot water to be delivered to the brew basket or a lesser amount, e.g., one half of the full amount, of ground coffee and/or hot water to the brew basket.

18 Claims, 7 Drawing Sheets

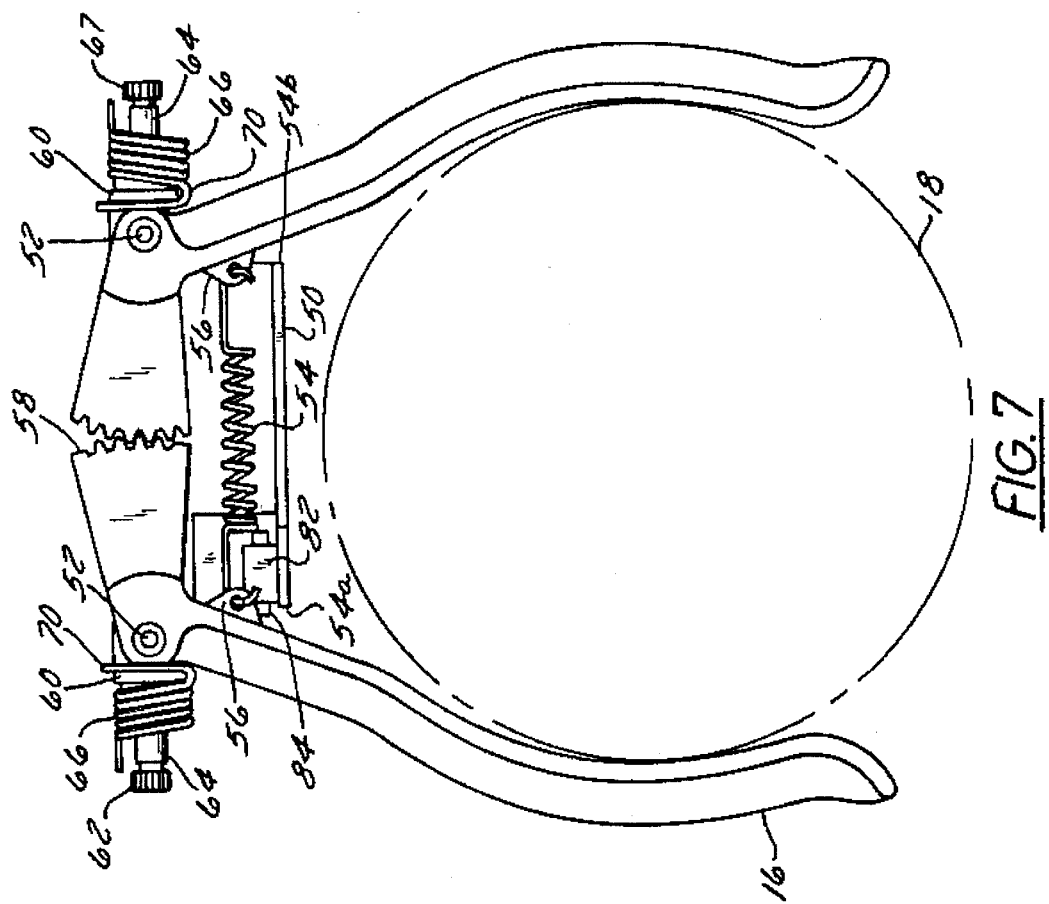
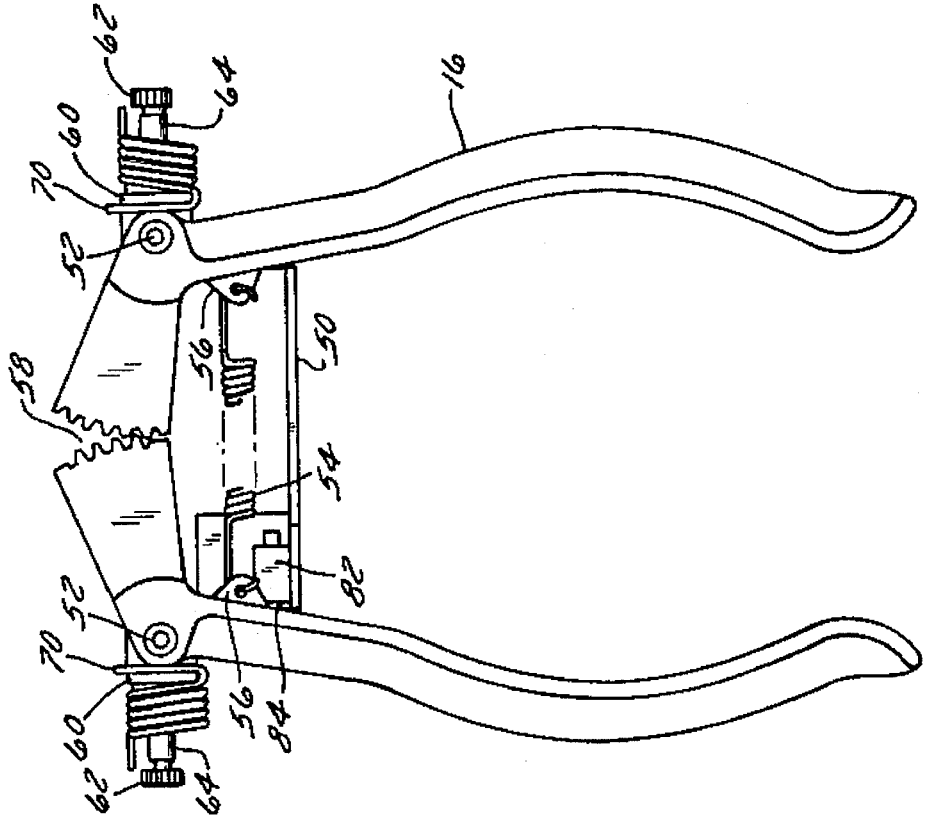

5,542,342

COFFEE GRINDER AND BREWER APPARATUS WITH BASKET SENSING AND GRIND ONLY FEATURE

BACKGROUND OF THE INVENTION

The present invention relates to a grinder brewer device for the grinding of coffee beans and distribution of the ground coffee to a brew basket for brewing of a coffee beverage.

Typical coffee grinding apparatus having the capability of grinding coffee beans and delivery of the resulting ground coffee either to a bag or, in the case of a combination grinder-brewer apparatus, to a brew basket employing some type of bag or basket holding device to hold the bag or basket beneath a channel communicating with the grinder. It has long been known to provide some fail-safe mechanism to prevent operation of the grinder in a grinder apparatus for the delivery of grounds to a bag. For example, U.S. Pat. No. 2,900,140 to Schulman et al discloses a coffee grinder that uses a contact switch that prevents operation of the grinder unless a bag is positioned beneath the grinder and further requires the operator to manually move a lever to a grinding position. U.S. Pat. 4,685,624 to Nidiffer discloses the use of a mechanically operated rocker arm that closes a normally open switch in the grinder circuit when the arm is engaged by a bag put into position beneath the grinder opening.

The industry lacks a combination coffee grinder-brewer in which the grinder and/or brewer mechanism will not operate unless the brewer basket is in position between the retaining arms for the basket. Moreover, such combination apparatus do not have the ability to make ground coffee without the brewing operation being initiated. Therefore, it is an paramount object of the present invention to provide for a combination grinding and brewing apparatus in which a grind only feature is included. It is still another important object of the present invention to provide for a combination grinding and brewing apparatus in which the apparatus is disabled from carrying out any grinding and/or brewing cycles unless the brew basket is properly positioned in the apparatus.

SUMMARY OF THE PRESENT INVENTION

The present invention pertains to an apparatus having a coffee bean grinding system that has a cycle for the grinding of coffee beans and a cycle for the transfer of hot water to a brew basket in which the ground coffee is delivered or other ground coffee or flavored beverage substance is manually placed. The apparatus includes a grinder for grinding coffee beans and distributing the ground coffee into a brew basket held by a pair of pivotally mounted retaining arms. The basket is held by the arms beneath a passageway communicating with the grinder. The apparatus further includes a brewing system for the distribution of hot water over ground coffee positioned in the brew basket and a control circuit for initiating the grind-only, the brew-only, and/or the combined grinding and brewing cycles. The control circuit additionally has a brew basket sensing switch that is positioned adjacent the retaining arms and is open when no basket is positioned between the retaining arms and closed when a basket is positioned between the arms. The open brew basket sensing switch disables the control circuit which then does not initiate any cycle. Thus the problem of grounds or hot water being delivered accidentally when no basket is present is avoided.

DESCRIPTION OF THE DRAWING

FIG. 6 is a bottom view of the articulating arms of the grinder and brewer apparatus before insertion of a basket therebetween showing the positioning switch in contact with one of the arms and in a circuit open position and illustrating the pivoting action of the arms about a supporting structure;

FIG. 7 is a view identical to FIG. 6 except a brew basket is in position between the articulating arms showing the brew basket positioning switch out of contact with one of the brewing arms and in a circuit closed position;

DETAILED DESCRIPTION OF THE PREFERRED EMBODIMENT

Figure 1:
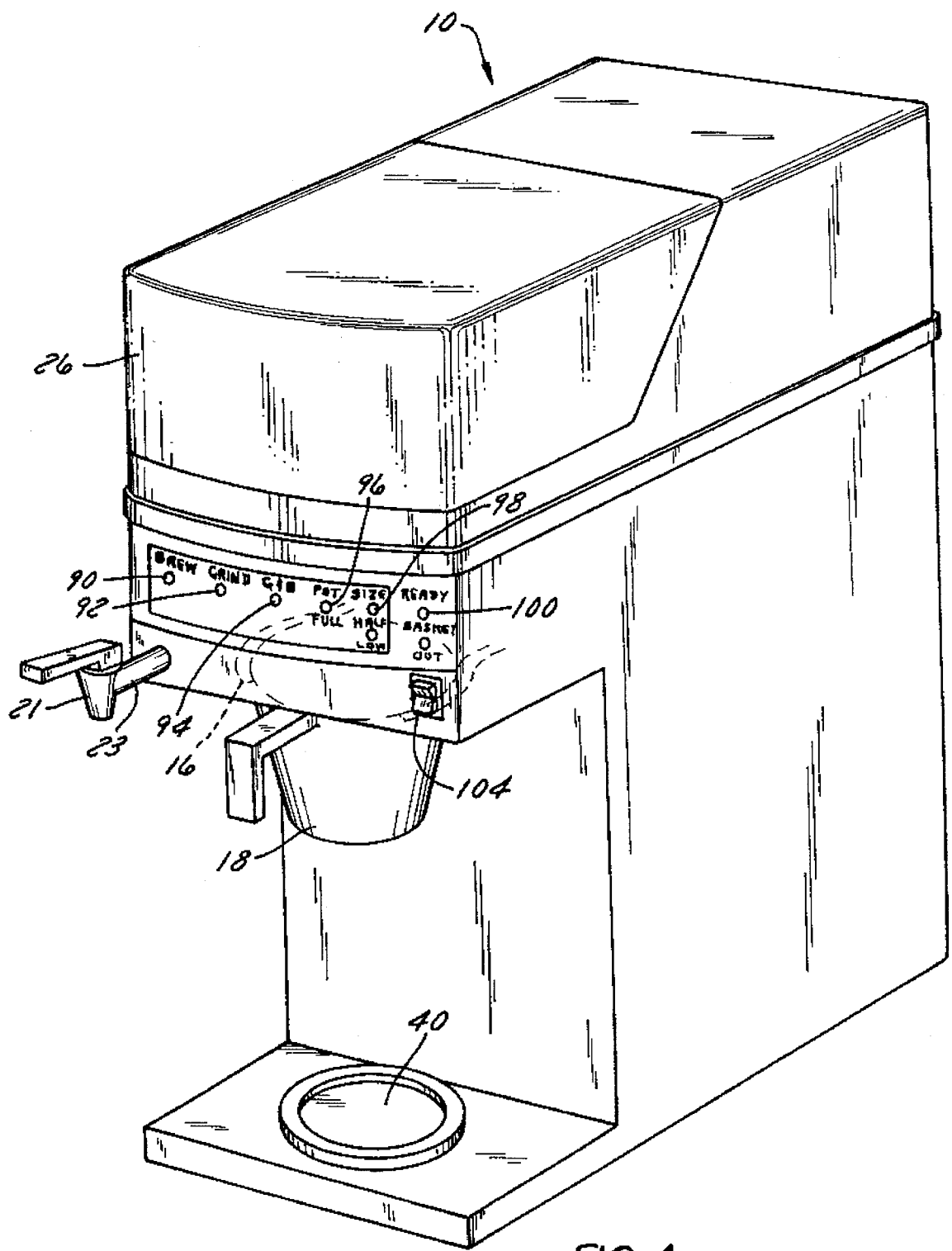
FIG. 1 is a perspective of a grinder and brewer apparatus incorporating the present invention.
Figure 2:
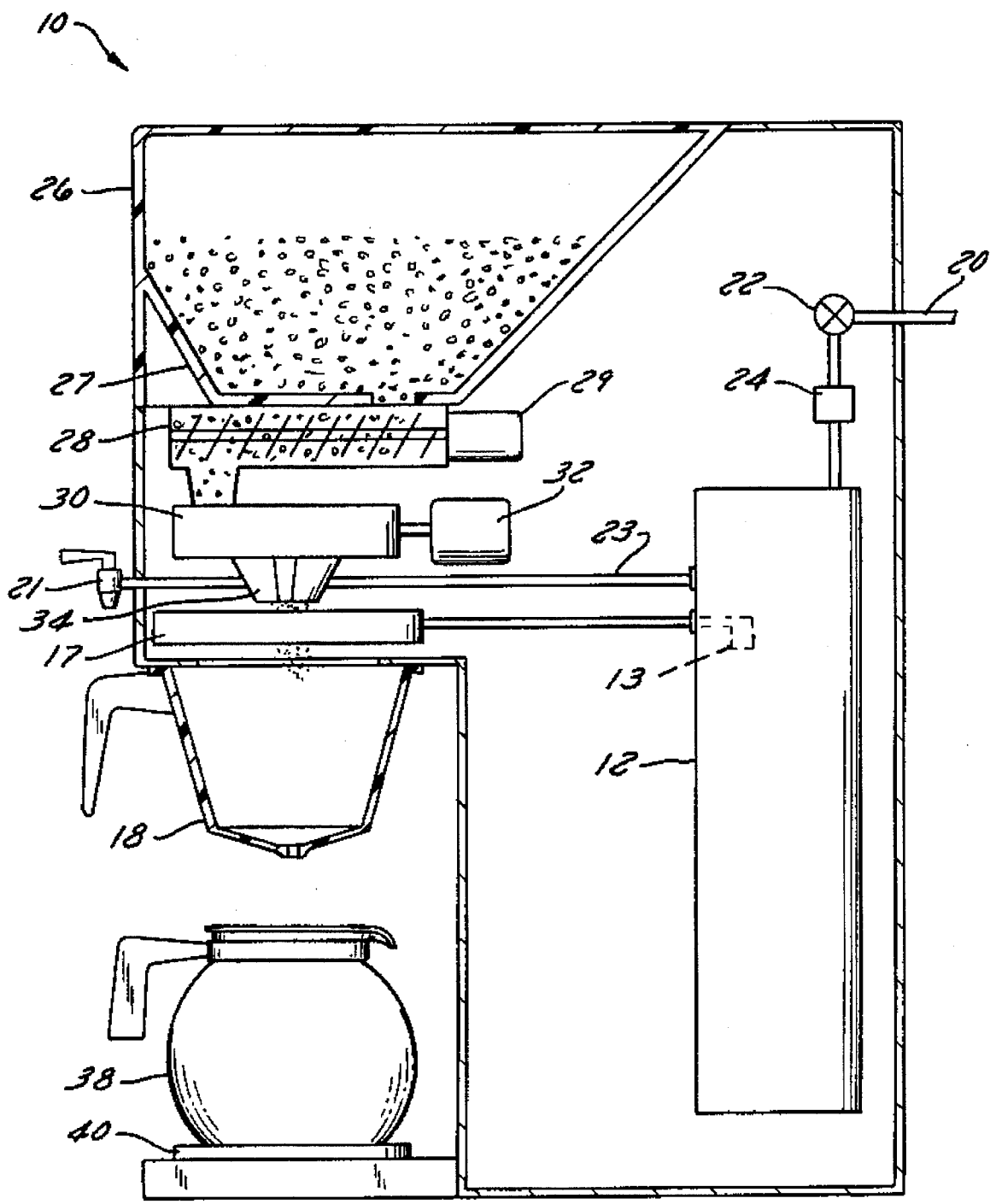
FIG. 2 is a side view of the apparatus of FIG. 1 illustrating the various major components thereof.
Figure 10:
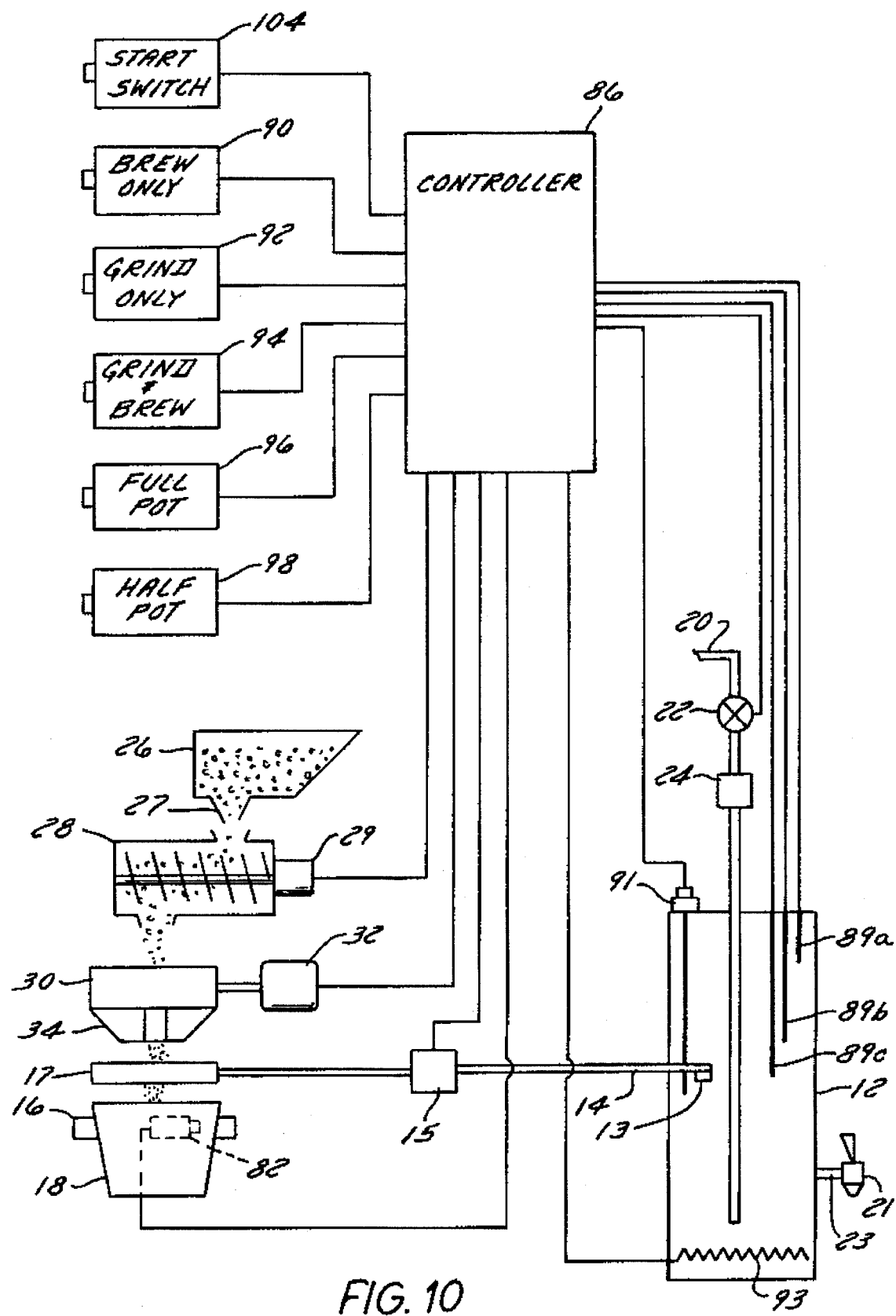
FIG. 10 is a schematic showing the basic circuitry of the apparatus controller that includes brew basket sensing, grin-only, brew-only, grind and brew, and start cycle switches.

Reference is now made to FIGS. 1 and 2 in conjunction with FIG. 10 that illustrate an apparatus 10 for the grinding of coffee beans and the brewing of the resulting ground coffee. Apparatus 10 is provided with a water storage tank 12 that is connected via a siphon cup 13 and water line 14 to a water distribution head 17 positioned in apparatus 10 above a brew basket 18. Water from an outside remote source (not shown) is fed to tank 12 by water line 20 through off-on valve 22 and water pressure regulator 24. A hot water tap 21 fed by line 23 from tank 12 may be secured to the front of apparatus 10 as best seen in FIG. 2. A coffee bean storage hopper 26 communicates via funnel 27 directly to a coffee bean grinder 30 driven by a motor 32 or to an intermediate positioned bean portioning device such as solenoid operated slide valves or an auger mechanism 28 driven by an auger motor 29. The portioning device then feeds the predetermined volume of coffee beans to grinder 30. Because both of these portioning transfer mechanisms are well known in the prior art and not a part of the present invention, no discussion is deemed necessary. However, U.S. Pat. Nos. 4,789,106 and 5,217,108, respectively, illustrate valve and auger transfer devices that may be utilized with the present invention.

Following portioning of the beans by the portioning mechanism, grinder 30 receives and grinds the portioned beans with the resulting ground coffee being fed through grinder throat 34 into brew basket 18 maintained in position by a pair of articulating basket arms 16 (seen in FIG. 1). A decanter 38 is positioned beneath brew basket 18 on a hot plate 40.

As best seen in FIG. 1, the front wall of apparatus 10 supports a control panel that includes a brew only switch 90, grind only switch 92, grind and brew switch 94, full brew switch 96 and a half brew switch 98. The control panel also has a hot water ready indicator light 100, a basket out indicator light 102 and a cycle start switch 104. All of these will be discussed in more detail below.

When the basket 18 is positioned beneath and in an abutting relationship with underneath surface 10a, it is highly desirable that the arms 16 be able to accommodate different diameter and flange sizes of brew baskets. Commonly assigned and copending application Serial Number (Attorney's docket number 0001/205) describes a coffee grinder and brewer with arms that articulate vertically and horizontally and provide an advantageous assembly for receiving various style baskets. The details of such an assembly are described in the aforementioned application, with only the basic structure described herein for an understanding of the present invention.

Figure 3:
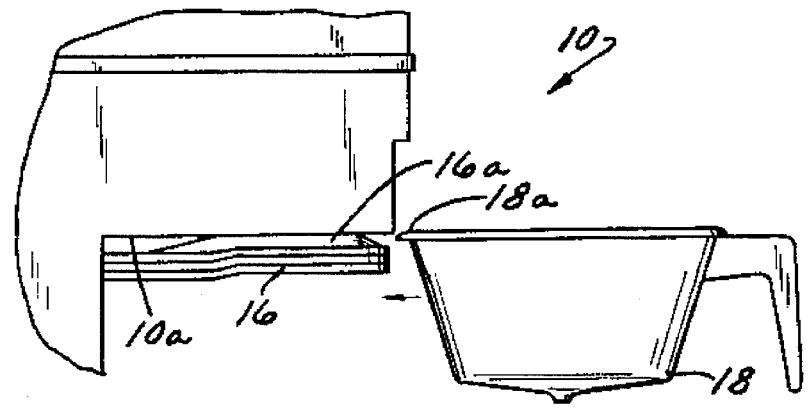
FIGS. 3, 4 and 5 are schematic side views of the apparatus showing the vertical articulation of the arms of a brew basket retainer as a brew basket is being inserted between the arms.
Figure 4:
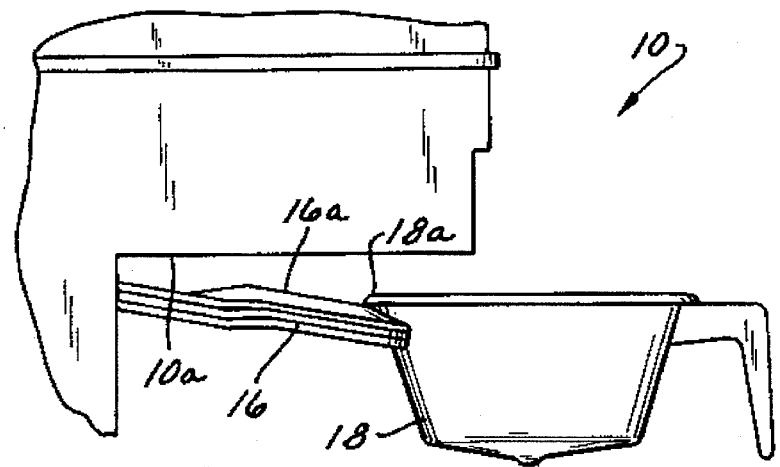
Figure 5:
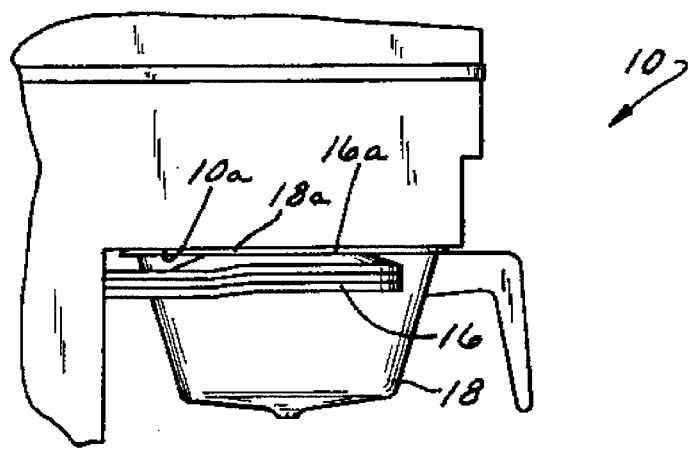

As basket 18 is pushed between the arms 16, the arms are forced apart and are simultaneously moved downward. The latter motion is best seen in FIGS. 3, 4 and 5 while the former motion is depicted in FIGS. 6 and 7. As basket 18 engages the initial or front part 16a of the arms 16, a camming action occurs and arms 16 pivot downwardly away from surface 10a. Once basket 18 is completely pushed into place between arms 16, the upward biasing force of the arms 16 cause the flange 18a of basket 18 to engage the underneath surface 10a in a sealed relationship to prevent the escape of steam occurring during the brewing cycle. As stated in the aforementioned application, the arms are capable of accepting baskets of various diameters and flange widths.

Simultaneously with the vertical pivoting motion of arms 16, the arms are capable of pivoting about a vertical axis for motion in a horizontal plane. This is clearly seen in FIGS. 6 and 7 in which arms 16 are shown pivotally mounted about pins 52 journaled into an arm support brackets 50. From a comparison of FIG. 6 to FIG. 7, it is clear that arms 16 readily articulate horizontally apart to accommodate basket 18. Arms 16 are biased toward one another under the influence of a spring 54 attached at the distal ends thereof to flanges 56 integral with each arm 16. The ends of bracket 50 abut arms 16 when in the closed position illustrated in FIG. 6. As may be seen the opposite end or rear extension of each arm 16 is inwardly canted and provided with a gear element 58 that operably engage or mesh with one another. The operative engagement of the gear elements 58 ensure that the front portions of arms 16 move apart simultaneously along the identical arc segment about pin 52 and thus ensure that basket 18 is centered beneath surface 10a.

The structure permitting arms 16 to articulate vertically can best be seen in FIGS. 6, 7, 8 and 9. As seen therein, bracket 50 has a pair of right angle flanges 60 each spaced slightly from pins 52. Extending outwardly from each flange 60 is a pivot pin 64 with a cap 62 of greater diameter than the diameter of the shank of pivot pin 64. A helical torsion spring 66 is wrapped about a portion of the shank of each pivot pin 64. Each spring 66 is provided with a downwardly extending first leg 68 with outwardly turned distal ends 68a and, as described below, adapted to be secured to the side of the housing of the apparatus 10. A second leg 70 of each spring 66 is bent around and secured to its associated flange 60.

The entire brewer basket arm support assembly is mounted so that the shanks of pivot pins 64 ride on a pair of vertical slots (not shown) in the sides 74 of the apparatus 10 with the caps 62 abutting the outside surface of sides 74. The outwardly turned distal ends 68a are positioned within registering apertures 76 in sides 74. Thus, when a basket is urged between arms 16, the width of the basket flange causes arms 16 to be cammed downwardly against the biasing force supplied by springs 66. Once the basket is positioned within and firmly grasped by arms 16 due to the inward urging of spring 54, the upward force supplied by springs 66 causes the flange or rim 18a of basket 18 to tightly abut around the entire circumference thereof against the under surface 10a of apparatus 10. The abutment between flange 18a and surface 10a minimizes escape of moisture when a brewing cycle is underway and hot water is being distributed to the ground coffee.

Figure 8:
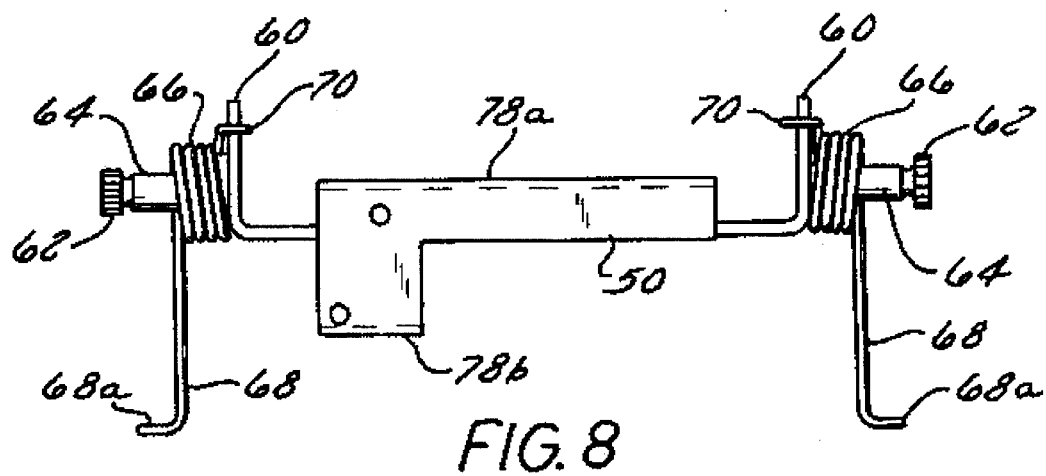
FIG. 8 is a front view of the supporting structure for the articulating arms showing the pivoting action of the support structure about a horizontal axis.
Figure 9:
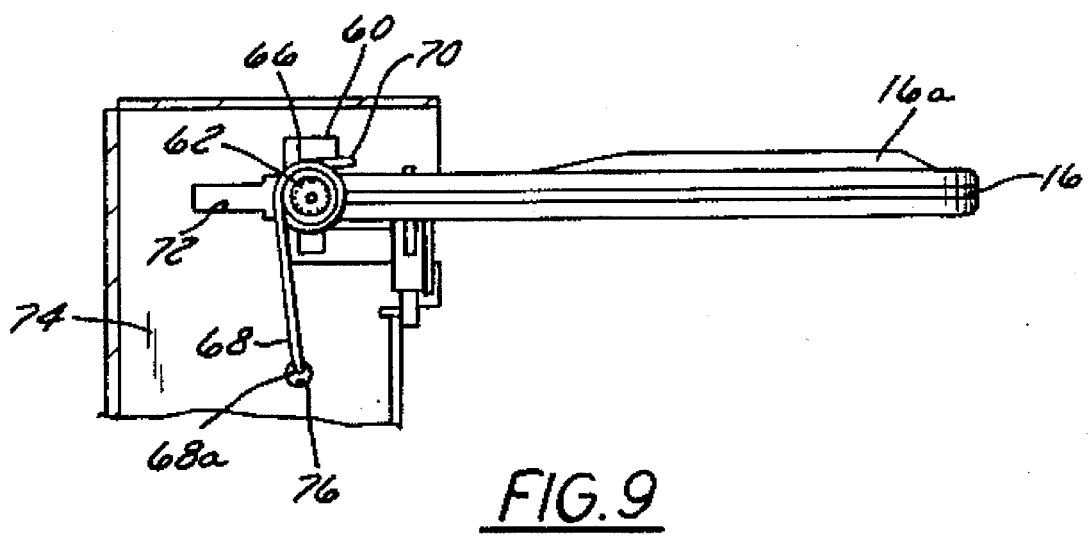
FIG. 9 is a side view of the arms and supporting structure positioned within and cooperatively engaged to the housing of the apparatus.

As illustrated in FIGS. 6 and 7, bracket 50 actually extends beneath springs 54 with the opposite edges 54a and 54b serving as stops for arms 16 when in the closed position. In FIG. 8, it may be seen that bracket 50 has an upwardly and downwardly extending flange 78. The upper extension 78a of flange 78 serves as a guard for spring 54 while the lower extension 78b provides a mount for switch 82 (not shown in FIG. 8). As seen in FIGS. 6 and 7, switch 82 has a button 84 positioned to contact and be depressed by one of the arms 16 when in the closed position. When the arms in the closed position, switch 82, as discussed below, is open and prevents energization of the apparatus for grinding and/or brewing cycle. Thus, unless a basket is in place between arms 16, the grind and brew cycle or grind-only cycle cannot be initiated.

Figure 11:
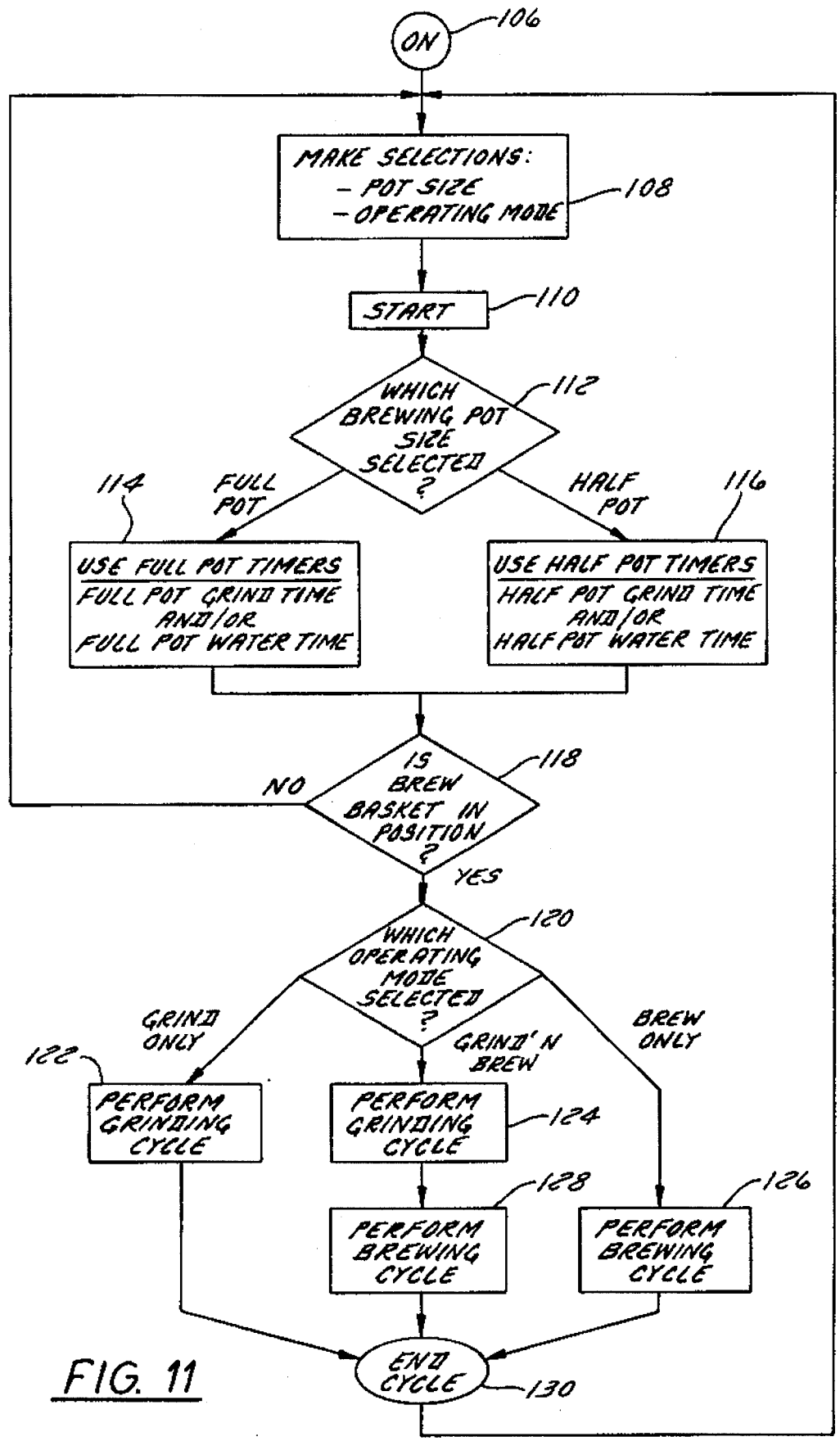
FIG. 11 is a flow diagram illustrating the operative steps taken by an apparatus incorporating the present invention.

The control circuitry and logic for the present invention is illustrated in FIGS. 10 and 11. A controller 86, for example, a programmable microprocessor, is connected to solenoid operated water valve 22, the circuitry and structure of the hot water transfer system as shown by numeral 15 and the connected water sensing probes 89a–c, hot water temperature sensor 91, hot water tap 21, brew-only switch 90, grind-only switch 92, hot water heating coils 93, grind and brew switch 94, full pot switch 96 and half pot switch 98. Additionally, controller 86 is in communication with auger portioning motor 29 and grinder motor 32. Initially, the unit is connected to a power source and valve 22 is opened until tank 12 is filled to water to a prescribed level as sensed by one of the water sensing probes 89. Controller 86 then turns on heating coils 93 until the temperature of the water reaches a predetermined level as measured by sensor 91. At this point, the indicator light 100 is turned on to indicate apparatus 10 is ready to operate. Coils 93 are periodically activated and deactivated depending upon the measurement made by sensor 91.

When indicator light 100 is on, the operator has available a number of operating modes each initiated by pushing one of the available switches 90, 92, or 94 on the front face of apparatus 10. A first mode includes the selection of a brew-only cycle in which ground coffee of a preselected type or some other flavorant can be manually placed into the brew basket and hot water is delivered to and distributed over the ground coffee or flavorant. A second mode includes the selection of a grind-only cycle in which only a grinding cycle occurs and ground coffee is delivered to the brew basket which then may be removed for use elsewhere. A third mode involves the combination of grinding and brewing cycles in which a precise throw of ground coffee is distributed into the brew basket followed by the distribution of hot water over the grounds. Additionally, the operator can also select either a full grind/brew or a partial grind/brew, e.g., a half grind/brew, for each operating mode. For example, when a half grind/brew pot is selected, then the selection of a grind-only operating mode would result in the delivery of a partial amount of ground coffee to the brew basket. A timing circuit may be used as part of the control circuit to control the duration of operation of the coffee bean portioning mechanism and thus the volume of beans delivered to the grinder. Similarly, the selection of the brew-only mode would result in a lesser amount of hot water being delivered to the basket using either volumetric or timing circuits as part of the control circuit. Although the description herein describes the use of separate switches for the full and partial pots for grinding and brewing, it should be understood that a full pot default mechanism may be provided necessitating only the closing of a partial pot switch when less than a full grind and/or brew is desired.

There are numerous types of well known hot water delivery systems in the prior art of coffee brewing including the volumetric system described in detail by U.S. Pat. 5,195,422 showing the use of water sensitive probes to provide selected different volumes of hot water to a brew basket. While it should be understood that other and different hot water transfer systems, such as timing hot water transfer systems, may be used in conjunction with the present invention, for the sake of simplicity, the system described generally herein and referred to in FIG. 10 is the one set forth in great detail in the aforementioned patent, incorporated by way of reference herein. At start up, the water rises within tank 12 until it touches sensor 89c. At this point controller 86 closes valve 22 in response to a signal from sensor 89c. When a brew cycle is initiated, valve 22 is again opened and the water is introduced at the bottom of tank 12, causing the water to again rise until it touches one of the sensors 89a (representing a full brew) or 89b (representing a partial brew). The valving structure of the volumetric system, shown generally as a box with character numeral 15, is activated and the water flows through siphon cup 13 to distribution head 17 until the level in the tank 12 recedes below the level of cup 13 and the suction thereto is broken. Reference is made to the aforementioned patent for the details of operation of water sensitive probes 89a, 89b, and 89c and the precise circuitry and structure of the hot water transfer system.

The flow chart of FIG. 11 clearly depicts the operative sequences of the present invention. Initially, the apparatus 10 is connected to an external power source and is turned on as indicated by ON circle 106. At this point, the operator is able to make decisions at block 108 and thereafter the start switch 104 is pushed to place apparatus in the START mode 110. Controller 86, as indicated by BOX 112, then determines which grinding/brewing size was selected and sets timers for the operating time of portioner mechanism and/or determines which water sensing probe is to be connected into the hot water transfer system. That is, when a half grind/brew and a grinding-only cycle have been selected, the portioner operates for a time necessary to carry a volume of coffee beans approximately one-half of a full amount to the grinder and the grinder motor then times out a predetermined time interval following the cessation of operation of the portioning device to ensure all beans delivered to the grinder have been fully ground and dispensed to the brew basket. Similarly, if a brewing-only cycle has been selected following the selection of a half grind/brew, the volume of hot water transferred to the brew basket is about one half of the amount transferred when a full grind/brew cycle has been selected. The full grind/brew cycle is indicated by BOX 114 and the half grind/brew is indicated by BOX 116.

However, none of the cycles can be initiated unless controller 86 has determined the brew basket is in position between the basket arms, as shown by BOX 118. If the determination is NO, then the basket must be put in before the cycles can be started. If the determination is YES, then controller 86 determines which operation mode has been selected and initiates the proper cycles, as illustrated by BOXES 122–128. The cycles then end at END CYCLE 130.

From a reading of the above, it may be seen that the grinding and brewing apparatus of the present invention provides considerable flexibility to an operator. By providing a grind-only feature, operators of the apparatus can use the device to grind coffee beans and manually transfer the ground coffee to other and different units without initiating a brewing cycle. Additionally, the apparatus may also have a brewing-only feature in which hot water may be supplied to the brew basket with no initiation of a grinding cycle in the apparatus. Moreover, the basket out switch provides considerable assistance in that it precludes the possibility of operating the device without a basket being positioned properly in place. This avoids accidental spills of grounds and/or hot water. Finally, as can be understood from the description, the apparatus of the present invention may also be supplied with a half grind/brew grind/feature to be combined with the grind-only and brew-only features, thus providing a delivery of lesser amounts of ground coffee, hot water, and/or brewed coffee. It can now be readily appreciated that, in light of a reading of the foregoing description and drawings, those with ordinary skill in the art will be able to make changes and modifications to the present invention without departing from the spirit or scope of the invention as defined in the following appended claims.

I claim:

1. An apparatus having a coffee bean grinding system having a cycle for the grinding of coffee beans and brewing of ground coffee, said apparatus including
   a grinder for grinding coffee beans and distributing the ground coffee into a brew basket held by retaining arms adjacent a passageway communicating with said grinder,
   a grinder motor for driving the grinder,
   a brewing system for the distribution of hot water to the brew basket, and
   a control circuit for selectively initiating grinding and brewing cycles, said control circuit including a grind-only switch which when closed the grinding cycle is initiated and the brewing cycle remains in an off state thereby ground coffee is distributed to said brew basket without the distribution of hot water.

2. The apparatus of claim 1 in which said control circuit includes a partial pot switch for setting the amount of ground coffee to be delivered to said brew basket, said grinder delivering a lesser amount of ground coffee to said brew basket when said partial pot switch is closed.

3. The apparatus of claim 1 in which said control circuit further includes a brew basket sensing switch and a start-cycle switch as part of said control circuit, said brew basket switch positioned adjacent said retaining arms and being open when no basket is positioned between said retaining arms and being closed when a basket is positioned between said retaining arms, said control circuit initiating said selected grinding and brewing cycles only when said brew basket sensing switch is closed and said start-cycle switch is closed.

4. The apparatus of claim 3 in which said brew basket sensing switch is open when abutted by one of said retaining arms.

5. The apparatus of claim 3 in which said retaining arms are pivotally mounted so as to articulate toward and away from each other, said arms biased to pivot toward each other and pivoting away from each other when a brew basket is pushed therebetween thereby grasping the brew basket, said arms being biased into a retaining arm closed position when no basket is present therebetween with said one arm abutting said brew basket sensing switch.

6. The apparatus of claim 3 including a brew-only switch as part of said control circuit, said control circuit activating said brewing cycle and not said grinding cycle when said brew only switch is closed and said basket is present between said arms thereby hot water is distributed to said brew basket without the distribution of ground coffee.

7. The apparatus of claim 6 in which said control circuit includes a partial pot switch for setting the amount of hot water to be distributed to said brew basket, said control circuit causing said brewing system to deliver a lesser amount of hot water than when said partial pot switch is closed.

8. An apparatus for the grinding of coffee beans and brewing of the ground coffee comprising a storage hopper for coffee beans, a grinder mechanism in communication with said hopper for grinding said beans, a pair of articulating brewer basket retaining arms positioned beneath a passageway leading to said grinder for retaining a brew basket in contact with an underneath surface of said apparatus, said arms pivotally attached to said apparatus and being biased to pivot toward each other so as to grasp said basket when urged therebetween, a hot water distribution system for distributing hot water to said brew basket, said system including a hot water storage tank and a water distribution head positioned in a region bounded by the contact between said basket and said underneath surface, said distribution head in communication with a hot water storage tank, and a control circuit for operating said grinder mechanism and hot water distribution system, said circuit including a first switch for initiating a grinding and brewing cycle, a second switch for initiating a grind only cycle, and a third switch positioned to abut one of said arms when no basket is positioned between said arms whereupon said third switch is open, said control circuit energizing said grinder mechanism only when said second and third switches are closed and enrgegizing both of said grinder mechanism and said water distribution system only when said first and third switches are closed.

9. The apparatus of claim 8 in which said arms are connected by a spring element biasing said arms about said pivot toward one another.

10. The apparatus of claim 9 in which said arms are pivotally mounted to a support structure that is in turn pivotally mounted within said apparatus so as to permit movement of said arms in a vertical direction toward and away from said underneath surface, said support structure being biased so as to cause said arms to move toward said underneath surface.

11. The apparatus of claim 10 in which said third switch is mounted on said support structure.

12. The apparatus of claim 8 including a fourth switch, said control circuit energizing said water distribution system only when said third and fourth switches are closed.

13. The apparatus of claim 12 including a partial pot switch, said control circuit delivering lesser amounts of ground coffee or hot water or both when said partial pot switch is closed.

14. A coffee bean grinding and brewing apparatus including a storage hopper for containing coffee beans, a coffee bean portioning mechanism communicating with said hopper for providing selected quantities of beans;

a grinder communicating with said portioning mechanism and a grinder motor for driving said grinder, a pair of basket retaining arms pivotally mounted to a support structure below said grinder, said arms being biased toward one another and said support structure providing a stop for said arms when a basket is not therebetween, said structure being pivotally mounted within said apparatus and being biased so as to pivot said arms upwards and cause a basket retained by said arms to abut against an underneath surface of said apparatus, a passageway leading from said grinder to an opening in said underneath surface within an area abutted by said retained basket, a hot water distribution system including a hot water tank and a hot water distribution head communicating with said tank for distributing hot water to ground coffee in said retained basket, and a control means for energizing said grinder motor and controlling flow of hot water from said tank to said head, said control means energizing said grinder only when said basket is being retained between said pair of retaining arms.

15. The apparatus of claim 14 in which said control means includes a switch means positioned on said support structure for disabling said control circuit when a basket is absent.

16. The apparatus of claim 15 in which said switch means is a first switch in a circuit of said control means that is opened by one of said retaining arms in the absence of a basket and closed in the presence of a basket.

17. The apparatus of claim 16 including a grind-only switch in the circuit of said control means, said control means energizing said grinder motor and not opening said flow of water between said distribution head and said hot water storage tank when both said grind-only switch and said first switch are closed.

18. The apparatus of claim 17 in which said circuit of said control means includes a partial pot switch, when said partial pot switch is closed, said control circuit timing said portioning mechanism to deliver a lesser amount of coffee beans to said grinder than when said partial pot switch is open.

* * * * *